United States Patent
Kaminsky et al.

(10) Patent No.: US 7,529,842 B2
(45) Date of Patent: May 5, 2009

(54) METHOD, SYSTEM AND PROGRAM PRODUCT FOR DETECTING AN OPERATIONAL RISK OF A NODE

(75) Inventors: David L. Kaminsky, Chapel Hill, NC (US); John Michael Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 10/321,265

(22) Filed: Dec. 17, 2002

(65) Prior Publication Data

US 2004/0117477 A1    Jun. 17, 2004

(51) Int. Cl.
*G06F 15/16* (2006.01)
(52) U.S. Cl. .................................................. 709/229
(58) Field of Classification Search .................. 709/217, 709/220–224, 234; 705/1, 7, 14
See application file for complete search history.

(56) References Cited

U.S. PATENT DOCUMENTS

| | | | |
|---|---|---|---|
| 5,974,237 A | | 10/1999 | Shurmer et al. |
| 6,298,308 B1 * | | 10/2001 | Reid et al. ........................ 702/56 |
| 6,473,794 B1 * | | 10/2002 | Guheen et al. .................... 709/223 |
| 6,519,571 B1 * | | 2/2003 | Guheen et al. .................... 705/14 |
| 6,536,037 B1 * | | 3/2003 | Guheen et al. .................... 717/151 |
| 6,606,744 B1 * | | 8/2003 | Mikurak ........................ 717/174 |
| 6,615,166 B1 * | | 9/2003 | Guheen et al. .................... 703/27 |
| 6,671,818 B1 * | | 12/2003 | Mikurak ........................ 714/4 |
| 6,957,186 B1 * | | 10/2005 | Guheen et al. .................... 705/1 |
| 6,961,319 B2 * | | 11/2005 | Novaes ........................ 370/256 |
| 2002/0032544 A1 | | 3/2002 | Reid et al. |
| 2002/0052718 A1 | | 5/2002 | Little et al. |
| 2002/0059093 A1 | | 5/2002 | Barton et al. |
| 2002/0099578 A1 * | | 7/2002 | Eicher et al. .................... 705/7 |
| 2004/0064552 A1 * | | 4/2004 | Chong et al. .................... 709/224 |

FOREIGN PATENT DOCUMENTS

JP    2001077815 A    1/2001

OTHER PUBLICATIONS

Fakhouri et al., "Gulfstream—A System for Dynamic Topology Management in Multi-Domain Server Fars", Journal: IEEE—International Conference on Cluster Computing, Year 2001, pp. 1-8.
IBM Research Disclosure No. 431164, "Dynamic Monitoring of System Parameters", Mar. 2000, p. 577.

* cited by examiner

*Primary Examiner*—John Follansbee
*Assistant Examiner*—Saket K Daftuar
(74) *Attorney, Agent, or Firm*—A. Bruce Clay; Hoffman Warnick LLC

(57) ABSTRACT

Under the present invention, the performances of a plurality of similarly configured nodes are monitored and compared. If one of the nodes exhibits a performance that varies from the performances of the other nodes by more than a current tolerance, an operational risk is detected. If detected, an alert can be generated and one or more corrective actions implemented to address the operational risk.

8 Claims, 4 Drawing Sheets

METHOD, SYSTEM AND PROGRAM PRODUCT FOR DETECTING AN OPERATIONAL RISK OF A NODE

BACKGROUND OF THE INVENTION

1. Field of the Invention

In general, the present invention provides a method, system and program product for detecting an operational risk of a node. Specifically, the present invention allows an operational risk of a server to be detected based on a performance of the server with respect to other similarly configured servers.

2. Background Art

As the use of computer technology becomes more prevalent, the complexity of computer networks being implemented is increasing. Specifically, many businesses today implement computer networks (e.g., LAN, WAN, VPN, etc.) that utilize numerous servers. The roles of such servers are typical (i.e., perform computations, process requests, serve files, etc.). In many instances, the servers are configured to perform similarly, if not identically for a certain set of parameters. For example, a pool or set of identical servers, typically called a "server farm," are often used to service high-volume web sites. Similarly, storage servers are often pooled.

Unfortunately, with the extent to which servers have come to be relied upon, degraded performance or even total failure can occur for various reasons. Such reasons include, for example, software malfunctions, hardware errors, etc. Early detection of performance degradation is often vital because an administrator can avoid significant loss of productivity by implementing corrective actions in a timely fashion. Examples of typical correction actions are migration of users or applications from a "problem" server, restarting a software package, rebooting or replacing a server, etc.

To date, the detection of performance degradation has been a static process. Specifically, the performance of each server based on one or more operational aspects (parameters) is monitored and compared to some preset, external level. For example, a processor load on each server can be measured and then compared to an "acceptable" level. If the processor load (e.g., CPU load) of any of the servers is exceeding the acceptable level, an alert can be generated and a corrective action implemented. By basing the detection of possible performance degradation on an external level, however, many problems are presented. For example, the external level might not truly be an accurate indication of "normal" performance. Accordingly, unnecessary alerts and corrective action can be implemented. In many cases, the best way to determine "normal" performance would be to observe how the other similarly configured servers are performing. If all other servers were performing in a similar fashion (e.g., with a similar processing load) without problems, there might not be any reason to implement a corrective action. Unfortunately, no existing solution provides such functionality.

In view of the foregoing, there exists a need for a method, system and program product for detecting an operational risk of a node. Specifically, a need exists to detect an operation risk of a node by comparing the performance of the node to that of other, similarly (or identically) configured nodes. A further need exists for an operational risk to be detected if the performance of one node varies from the performances of the other nodes by more than a current tolerance.

SUMMARY OF THE INVENTION

In general, the present invention provides a method, system and program product for detecting an operational risk (i.e., risk of possible malfunction or performance degradation) of a node. Specifically, under the present invention, the performances of a plurality of similarly configured nodes are monitored and compared. If one of the nodes exhibits a performance that varies from the performances of the other nodes by more than a current tolerance, an operational risk is detected. The current tolerance can be based on any set of criteria/rules and/or performance history. The latter allows the tolerance to be fine-tuned or biased based on actual behavior of the nodes. In any event, if an operational risk is detected, an alert can be generated and one or more corrective actions implemented.

According to a first aspect of the present invention, a method for detecting an operational risk of a node is provided. The method comprises: (1) providing a plurality of nodes, wherein the plurality of nodes are similarly configured; (2) monitoring a performance of each of the plurality of nodes; and (3) detecting an operational risk if the monitored performance of one of the plurality of nodes varies from the monitored performances of the other nodes by more than a current tolerance.

According to a second aspect of the present invention, a system for detecting an operational risk of a node is provided. The system comprises: (1) an input system for receiving a monitored performance for each of a plurality of similarly configured nodes; and (2) a detection system for detecting an operational risk of one of the plurality of similarly configured nodes, wherein the operational risk is detected if the monitored performance of the one node varies from the monitored performances of the other nodes by more than a current tolerance.

According to a third aspect of the present invention, a program product stored on a recordable medium for detecting an operational risk of a node is provided. When executed, the program product comprises: (1) program code for receiving a monitored performance for each of a plurality of similarly configured nodes; and (2) program code for detecting an operational risk of one of the plurality of similarly configured nodes, wherein the operational risk is detected if the monitored performance of the one node varies from the monitored performances of the other nodes by more than a current tolerance.

Therefore, the present invention provides a method, system and program product for detecting an operational risk of a node.

BRIEF DESCRIPTION OF THE DRAWINGS

These and other features of this invention will be more readily understood from the following detailed description of the various aspects of the invention taken in conjunction with the accompanying drawings in which.

Figure 1:
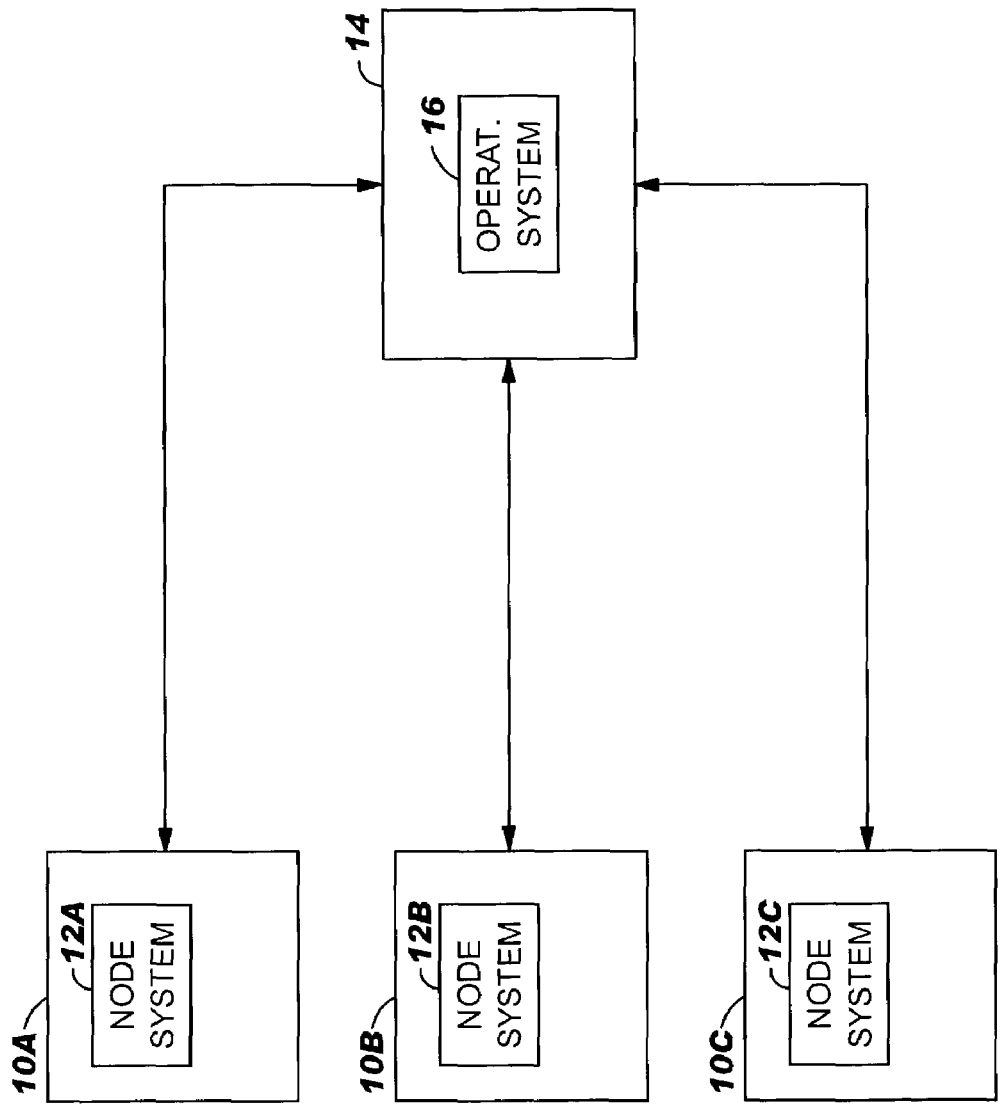
FIG. 1 depicts a system for detecting operational risk of a node, according to one embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for detecting an operational risk (i.e., risk of possible malfunction or performance degradation) of a node. Specifically, under the present invention, the performances of a plurality of similarly configured nodes are monitored and compared. If one of the nodes exhibits a performance that varies from the performances of the other nodes by more than a current tolerance, an operational risk is detected. The current tolerance can be based on any set of criteria/rules and/or performance history. The latter allows the current tolerance to be fine-tuned or biased based on actual behavior of the nodes. In any event, if an operational risk is detected, an alert can be generated and one or more corrective actions implemented.

Referring now to FIG. 1, a system for detecting an operational risk of a node according to one embodiment of the present invention is shown. As depicted, the system generally includes a plurality of nodes 10A-C in communication with control system 14. Under the present invention, nodes 10A-C are generally configured identically. Specifically, nodes 10A-C could be configured to perform identically with respect to a common set of (e.g., one or more) operational aspects (parameters). It should be understood, however, that nodes 10A-C need not be configured "identically" for the teachings described herein to be successful. That is, nodes 10A-C could be configured "similarly" to allow for slight variations during configuration. In any event, typical operational aspects for which the performance of each node 10A-C can be monitored include, among others, CPU load (average and peak), average and peak I/O response time, average and peak response time to classes of transactions (e.g., gold, silver, bronze), etc. It should also be understood that nodes 10A-C could be configured with respect to different operational aspects. In such an event, a mapping between operational aspects of nodes 10A-C could be provided (e.g., operational aspect "X" of node 10A corresponds to operational aspect "Z" of node 10B).

Under the present invention, a performance of each node 10A-C with respect to its' set of operational aspects is monitored and compared to the performances of other nodes. If the performance of a node varies (e.g., 10A) from that of the other nodes (e.g., 10B-C) by more than a current tolerance, an operational risk is detected. In the embodiment shown in FIG. 1, each node 10A-C includes a node system 12A-C, respectively. Each node system 12A-C will measure one or more "performance values" for each of the set of operational aspects. Once the performance values are measured, each node system 12A-C will generate an operational "report" or the like that includes the performance (e.g., the performance values) of the corresponding node as well as a node identifier. Node systems 12A-C will then transmit the operational reports to control system 14. Upon receipt, operations system 16 will analyze the operational reports and compare the monitored performances of nodes 10A-C to each other. As indicated above, if a node (as identified by the node identifier) has a performance that varies from that of the other nodes by more than the current tolerance, an operational risk is detected. For example, assume that node 10A is exhibiting an average I/O response time of thirty seconds, while nodes 10B-C are exhibiting an average I/O response time of 0.5 seconds. Further assume that the current tolerance for variation between nodes 10A-C for average I/O response time is 1.0 seconds. Since the variation is greater than 1.0 seconds (e.g., 29.5 seconds in this example), an operational risk is clearly detected.

In determining the current tolerance(s) for variation under the present invention, many methods can be implemented. In one embodiment, the current tolerance(s) can be static in that an administrator or the like could program tolerance(s) into operations system 16 (e.g., based on rules) that are known to result in operational risks when exceeded. In another embodiment, the current tolerance(s) can be dynamic such that they are "fine tuned" by operations system 16 according to historical data/trends (i.e., performance history). This allows "normal" operations conditions to be based on actual operating conditions rather than rigid administrator-imposed rules. For example, if an administrator-set tolerance for average I/O response time was 1.0 seconds, but historical data indicated that variations of up to 5.0 seconds could be accommodated without posing an operational risk, the administrator-set tolerance could be automatically "updated" by operations system 16 to 5.0 seconds (or to some value in between).

In any event, when an operational risk is detected, operations system 16 could then generate an alert, and optionally implement any corrective actions to address the operational risk. As indicated above, the current tolerance(s) could change based on the performance history of the nodes and/or the system. To this extent, if an alert is generated in response to a particular variance, but an administrator determined that the variance was actually acceptable, the same variance would not result in future alerts (i.e., unless the administrator indicates that future variances should be noted). This allows the present invention to "learn" during operation. In addition, with respect to corrective actions, certain actions could be programmed for certain known variances. For example, in response to a certain variance for a particular operational aspect, a software component might automatically be restarted. Accordingly, the present invention could maintain a "catalog of actions" in which a specific action can be identified and implemented based on the performance history thereof (i.e., its previous effectiveness at addressing a particular operational risk).

Figure 2:
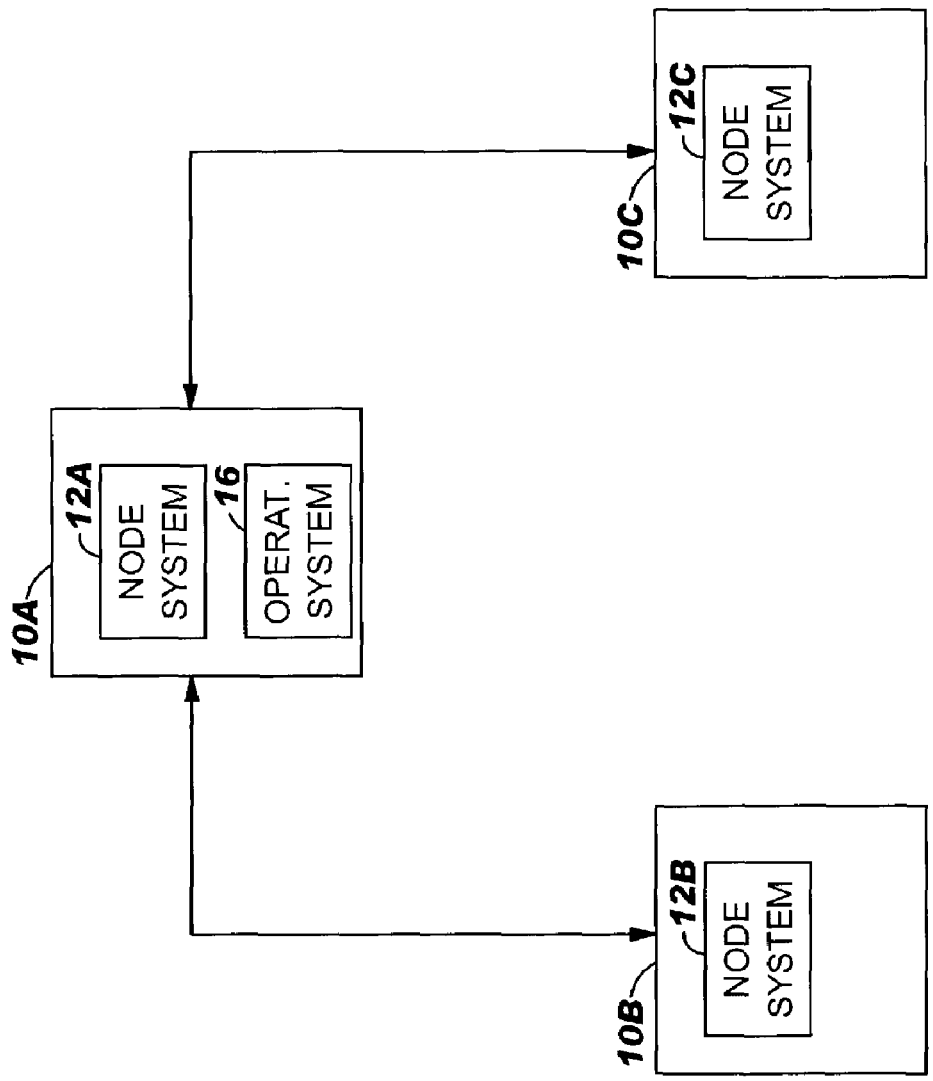
FIG. 2 depicts a system for detecting operational risk of a node, according to another embodiment of the present invention.
Figure 3:
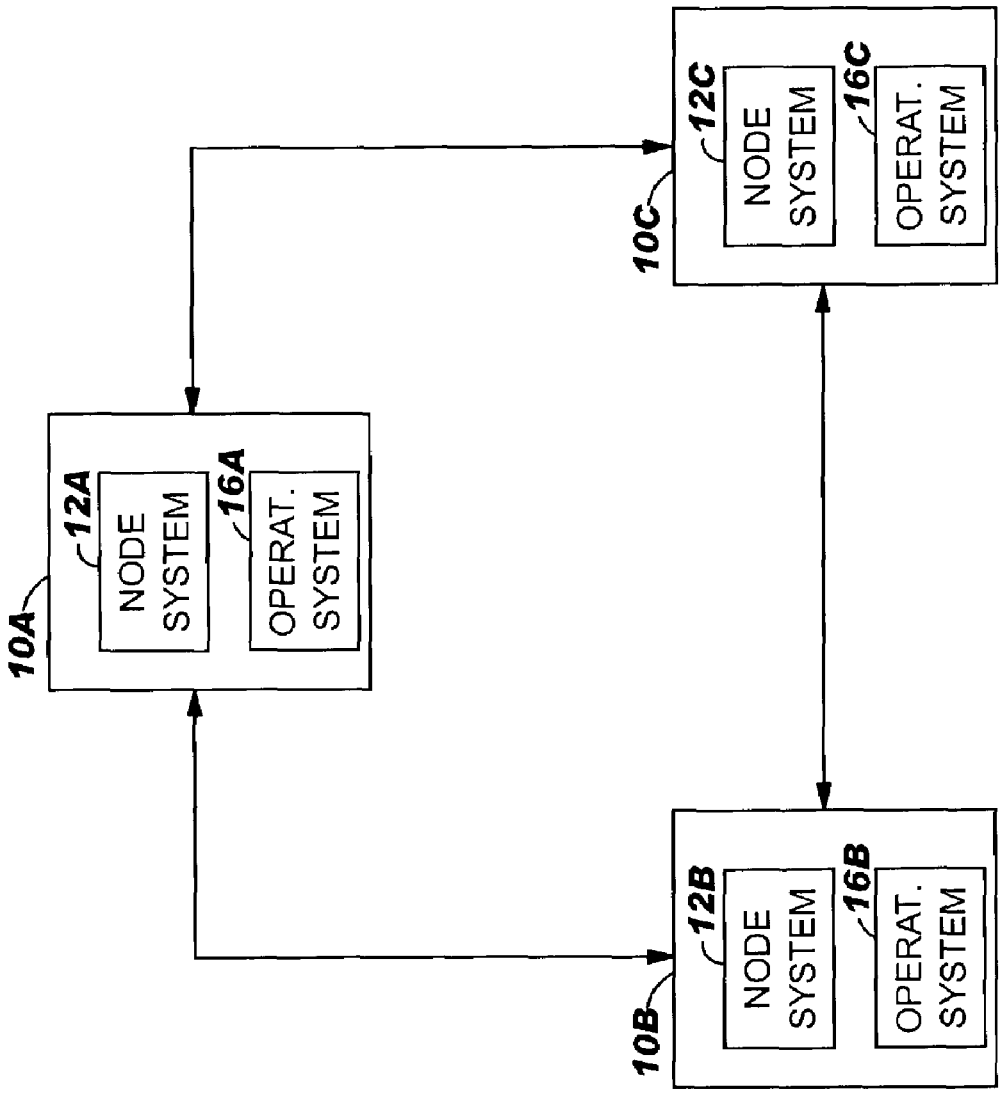
FIG. 3 depicts a system for detecting operational risk of a node, according to another embodiment of the present invention.

As shown in the embodiment of FIG. 1, nodes 12A-C report to an independent control system 14. It should be understood, however, that this need not be the case and that many variations are possible. For example, as shown in FIG. 2, operations system 16 could be loaded on one of nodes 10A-C (e.g., node 10A). In this event, nodes 10B-C would transmit their operational reports to node 10A, while node 10A's operational report could remain "local" (i.e., within node 10A). In yet another embodiment shown in FIG. 3, operation system could exist as a distributed application 16A-C across all nodes 10A-C. In this embodiment, each node 10A-C would exchange its operational report with the other nodes. Once a node has received the operational reports for the other nodes, it can detect whether any node (including itself) has an operational risk.

Regardless of the embodiment implemented, it should be understood that the operational reports could be transmitted to operations system 16 (or 16A-C) according to any schedule or criteria. For example, each node system 12A-C could be programmed to monitor the performances at predetermined time intervals. Each time the performances are measured, an operational report could be generated and transmitted to operations system 16. Alternatively, reporting could be done only when the performance values change or change by more than a set amount. Still yet, reporting could be based on a combination of predetermined time intervals and changes in performance values.

It should further be appreciated that having nodes 10A-C measure performance values, and generate an operation report for use by operations system 16 (or 16A-C) is only one illustrative embodiment for carrying out the present invention. For example, the performance values could be obtained by query (according to any schedule or criteria) from operations system 16 (or 16A-C). This would reduce the software that would be loaded on nodes 10A-C to carry out the present invention. Thus, the manner in which performance values are obtained by operations system 16 (or 16A-C) is not intended to be a limiting feature of the present invention.

In any event, communication between nodes 10A-C and/or with control system 14 can occur via a direct hardwired connection (e.g., serial port), or via an addressable connection in a client-server (or server-server) environment which may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

Figure 4:
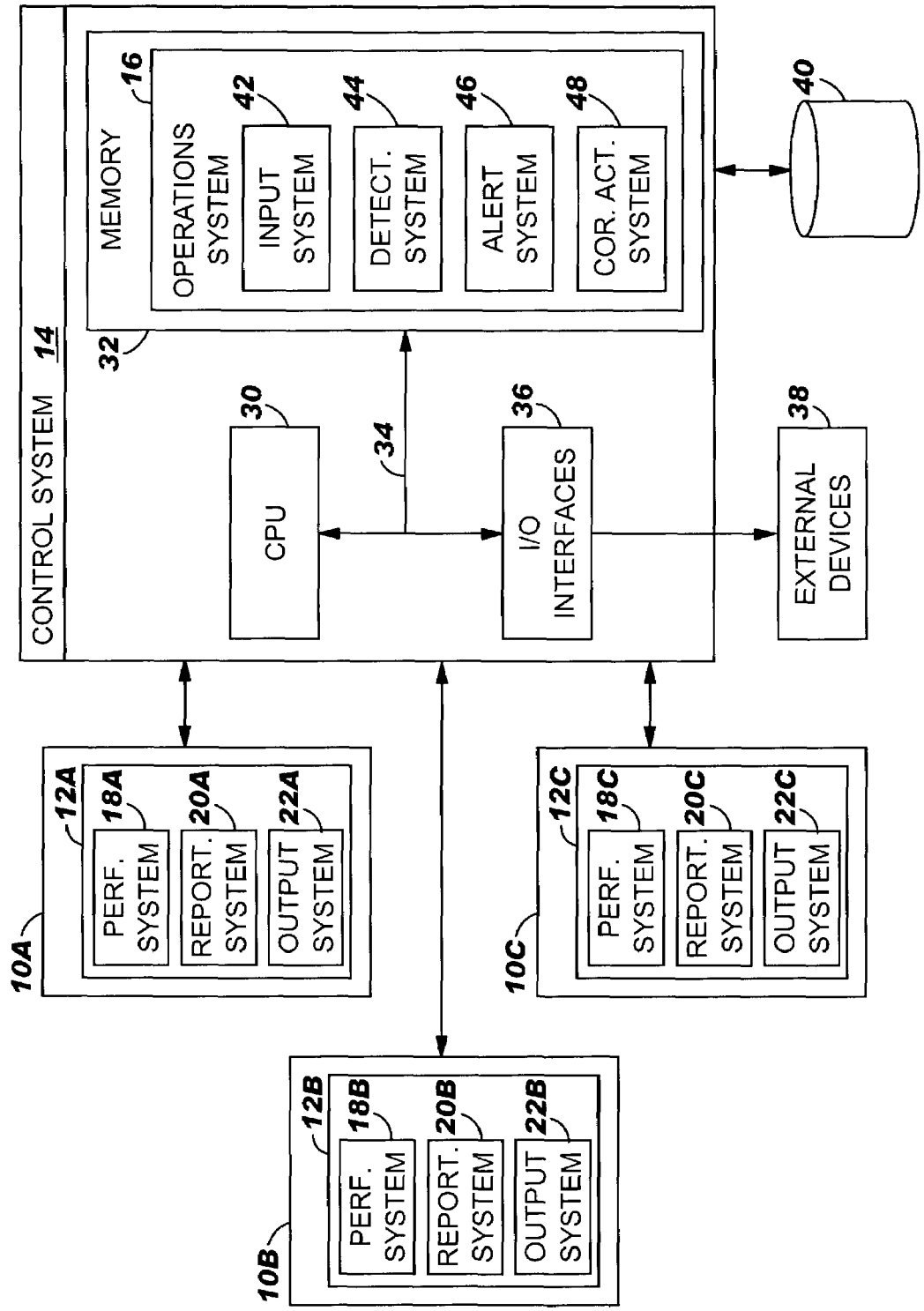
FIG. 4 depicts a more detailed diagram of the system of FIG. 1.

Referring now to FIG. 4, a more detailed diagram of the embodiment of FIG. 1 is shown. As depicted, control system 14 generally comprises central processing unit (CPU) 30, memory 32, bus 34, input/output (I/O) interfaces 36, external devices/resources 38 and database 40. CPU 30 may comprise a single processing unit, or be distributed across one or more processing units in one or more locations, e.g., on a client and server. Memory 32 may comprise any known type of data storage and/or transmission media, including magnetic media, optical media, random access memory (RAM), read-only memory (ROM), a data cache, a data object, etc. Moreover, similar to CPU 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LED screen, hand-held device, keyboard, mouse, voice recognition system, speech output system, printer, monitor, facsimile, pager, etc. Bus 34 provides a communication link between each of the components in control system 14 and likewise may comprise any known type of transmission link, including electrical, optical, wireless, etc. In addition, although not shown, additional components, such as cache memory, communication systems, system software, etc., may be incorporated into control system 14.

Database 40 provides storage for information under the present invention. Such information could include, for example, predetermined tolerances, reporting schedules, historical data, corrective actions, etc. As such, database 40 may include one or more storage devices, such as a magnetic disk drive or an optical disk drive. In another embodiment, database 40 includes data distributed across, for example, a local area network (LAN), wide area network (WAN) or a storage area network (SAN) (not shown). Database 40 may also be configured in such a way that one of ordinary skill in the art may interpret it to include one or more storage devices. It should be understood that although not shown for brevity purposes, nodes 10A-C would typically include computerized components (e.g., CPU, memory, etc.) similar to control system 14.

As indicated above, each node 10A-C will monitor its performance with respect to a set of operational aspects. The monitored performance will be compared to the performances of the other nodes. If the performance of a node varies from the performances of the other nodes by more than a current tolerance, an operational risk is detected. As depicted, each node 10A-C includes a node system 12A-C, respectively. Each node system 12A-C includes performance system 18A-C, reporting system 20A-C and output system 22A-C.

Under the present invention, performance systems 18A-C monitor the performances of the corresponding nodes 10A-C by measuring certain performance values for the set of operational aspects. Once performance has been determined, reporting systems 20A-C will generate the operational reports, which include the performance values as well identifiers for the corresponding nodes. Once generated, output systems 22A-C will then transmit the operational reports to control system 14. As indicated above, reporting generation and/or transmission can be performed according to any schedule or criteria. In any event, the operational reports will be received by input system 42 of operations system 16. Upon receipt, detection system 44 will compare the performances of nodes 10A-C to each other. If any of the nodes exhibit a performance that varies from the performances of the other nodes by more than a current tolerance (as accessed in database 40), an operational risk is detected. Under the present invention (as indicated above), the predetermined tolerances are typically based on administrator-set rules and/or historical data. In any event, if an operational risk is detected, alert system 46 can generate and transmit an alert (e.g., to an administrator or the like). Corrective action system 48 could then (optionally) implement one or more corrective actions to address the operational risk. To this extent, similar to the predetermined tolerances, the alerts and corrective actions could be based on historical data. For example, certain corrective actions could be implemented based on what corrective actions successfully avoided the specific operational risk in the past.

The present invention thus provides a way to detect and address operational risks for a set of nodes based on the comparison of the performances of the nodes to each other, as opposed to comparison solely to a some preset standard. This approach is more efficient and accurate than previous systems because it defines normal conditions of a node by the manner in which other similar or identical nodes are operating, and not solely by an external theoretic standard.

It should also be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, FIGS. 1-4 show a set of three nodes for illustrative purposes only. It should be understood that the teachings described herein could be implemented for any quantity of nodes. Furthermore, as indicated above, the performance values could be obtained based upon one or more queries issued from operations system 16 (or 16A-C) to nodes 10A-C. In this case, operations system 16 (or 16A-C) could include a query system or the like that contains program code for generating and issuing queries to obtain the needed performance values.

We claim:

1. A method for detecting an operational risk of a node, comprising:
    providing a plurality of nodes within an existing system, wherein each of the plurality of nodes is configured to perform similarly with respect to a set of operational aspects, wherein operational aspects include at least one of the following: average and peak CPU load, an average and peak I/O response time, or average and peak response time to classes of transactions;
    monitoring a performance of each individual node of the plurality of nodes, wherein the monitored performance of each individual node is determined by measuring a performance value of at least one of the set of operational aspects, and wherein at least one of the operational aspects that is monitored are limited to the individual node, wherein monitoring the performance of each individual node includes providing an operational report for each of the plurality of nodes, each operational report including the measured set of performance values and an identifier for a corresponding node;
    comparing the monitored individual performance of each individual node of the plurality of nodes with the monitored individual performance of a different node of the plurality of nodes, wherein the comparing is between two individual nodes and both individual nodes are within the plurality of nodes; and
    detecting an operational risk if the individual monitored performance of one of the plurality of nodes varies from the individual monitored performances of a different node of the plurality of nodes by more than a current tolerance, wherein the current tolerance is initially defined as a static administrator-set tolerance and is subsequently updated with a dynamic tolerance that is computed by an operations system based on a historical trend of the monitored performance of the plurality of nodes.

2. The method of claim 1, wherein the operational report is communicated at predetermined time intervals.

3. The method of claim 1, wherein the plurality of nodes comprises a plurality of servers.

4. The method of claim 1, wherein the plurality of nodes are identically configured.

5. The method of claim 1, wherein the current tolerance is further based on at least one of a set of rules.

6. The method of claim 1, further comprising generating an alert if the operational risk is detected.

7. The method of claim 1, further comprising identifying and implementing a corrective action to address the operational risk if the operational risk is detected.

8. The method of claim 7, wherein the corrective action is identified based on a previous effectiveness of the corrective action at addressing the operational risk.

* * * * *